Jan. 26, 1932.　　G. C. CHASE　　1,842,584
CALCULATING MACHINE
Filed Oct. 8, 1929　　14 Sheets-Sheet 3

INVENTOR.
George C. Chase
BY W. A. Sparks
His ATTORNEY.

Jan. 26, 1932.          G. C. CHASE                1,842,584
                    CALCULATING MACHINE
                  Filed Oct. 8, 1929     14 Sheets-Sheet 8

George C. Chase INVENTOR.

BY W. A. Sparks his ATTORNEY.

Jan. 26, 1932.   G. C. CHASE   1,842,584
CALCULATING MACHINE
Filed Oct. 8, 1929   14 Sheets-Sheet 10

George C. Chase INVENTOR.
BY W. A. Sparks
his ATTORNEY.

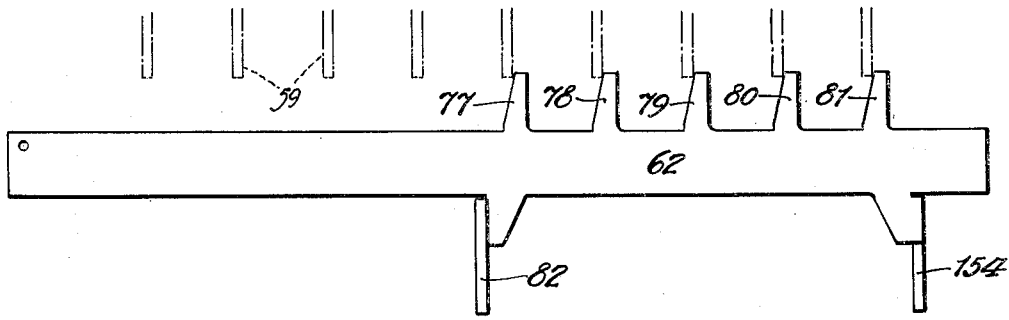
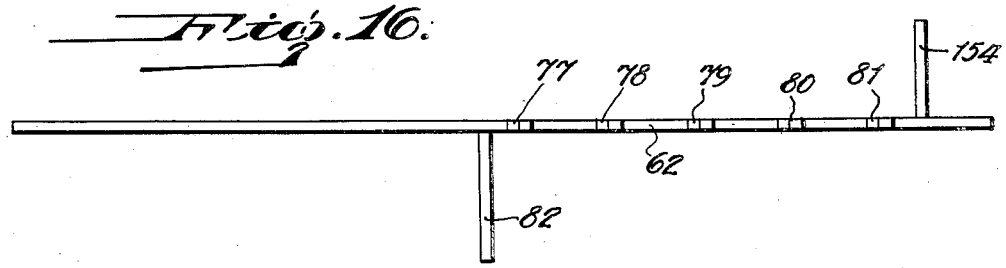
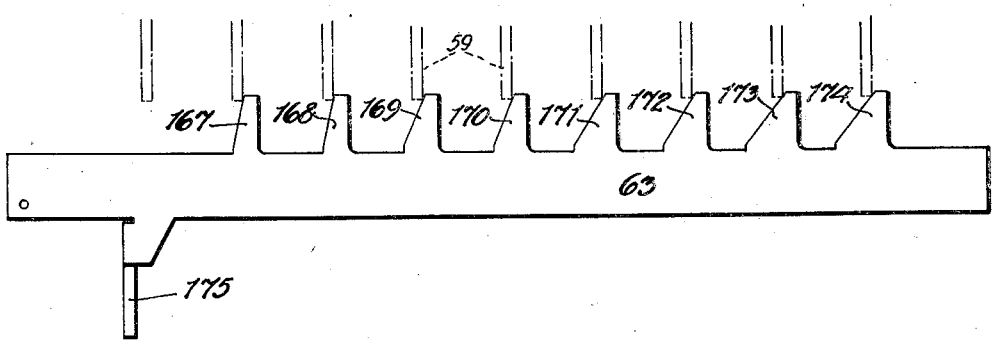
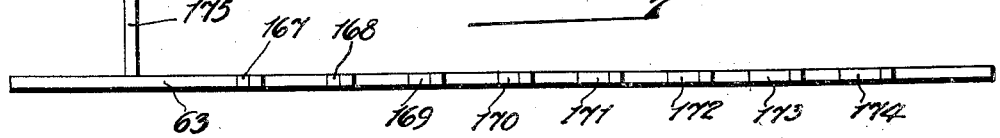

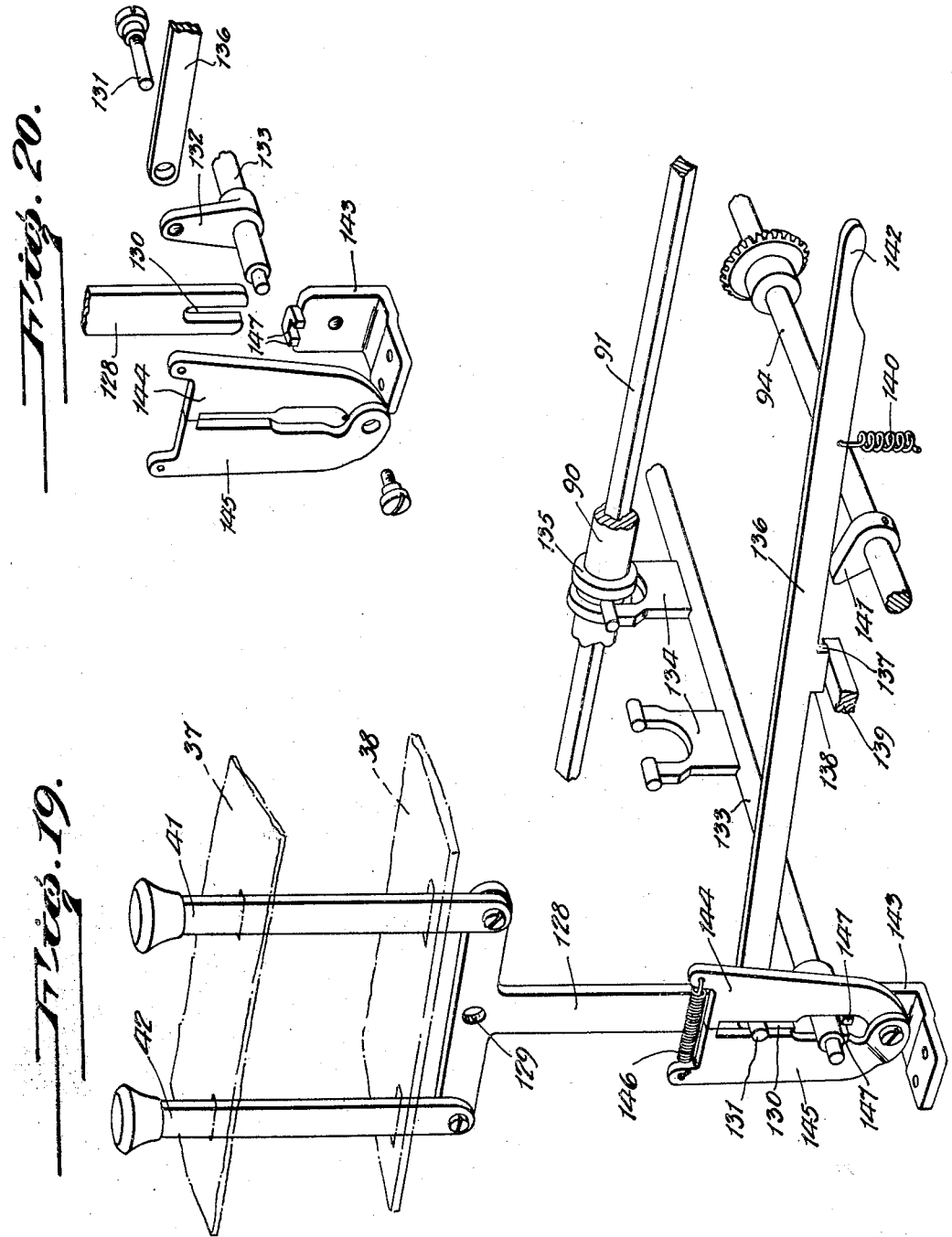

Jan. 26, 1932.   G. C. CHASE   1,842,584
CALCULATING MACHINE
Filed Oct. 8, 1929   14 Sheets-Sheet 13

George C. Chase INVENTOR.
BY W. A. Sparks
his ATTORNEY.

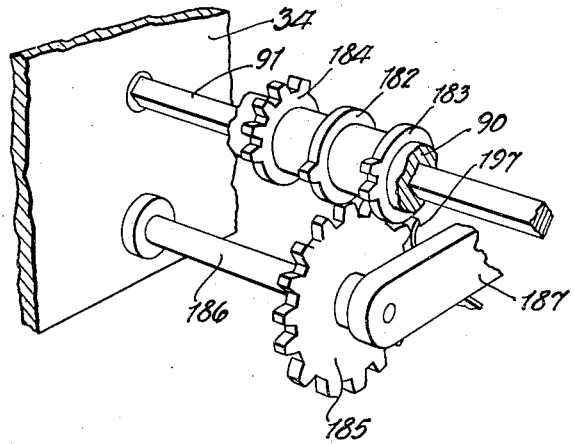
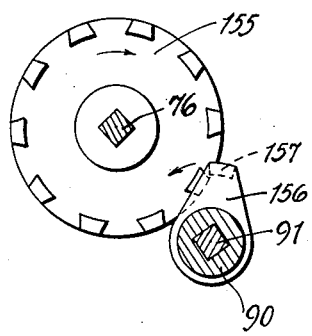
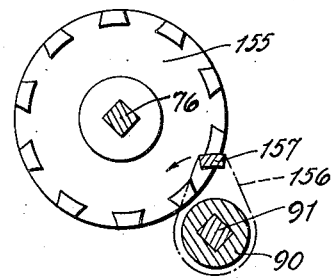
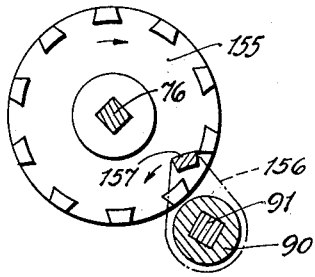
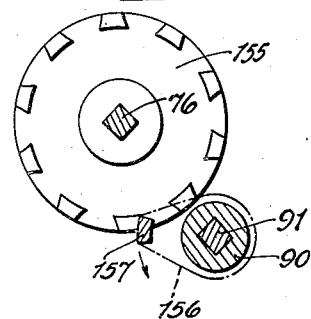

Patented Jan. 26, 1932

1,842,584

UNITED STATES PATENT OFFICE

GEORGE C. CHASE, OF SOUTH ORANGE, NEW JERSEY, ASSIGNOR TO MONROE CALCULATING MACHINE COMPANY, OF ORANGE, NEW JERSEY, A CORPORATION OF DELAWARE

CALCULATING MACHINE

Application filed October 8, 1929. Serial No. 398,205.

This invention relates to calculating machines and particularly calculating machines for performing multiplication and division.

The principal object of the invention is to provide means for carrying into operation certain principles of multiplication which are believed to be new in the art. These principles will be set forth at some length hereinafter.

Another object is to provide means suitable for effecting "short cuts" in multiplication and division.

Another object is to provide means for effecting computations with few cycles of operation of the machine.

Another object is to provide means which is simple and rapid of manipulation, and highly efficient for the purpose for which it is designed.

Other objects will appear as the description proceeds. All of these objects are attained by mechanism, one form of which is illustrated in the accompanying drawings, in which:

Figs. 11, 13, 15 and 17 are detail side elevations of key-operated slides of the machine.

Figs. 12, 14, 16 and 18 are top plan views of the same, respectively.

Fig. 19 is a perspective view of the "2X" and "5X" keys and connected parts.

Fig. 20 is an exploded view of the parts of the equalizer.

Fig. 24 is a perspective view of the counter-actuating segments and associated gear.

Fig. 27 is a detail view of the "2X eight-stop" when the parts have moved to a position where "7" has been registered.

Fig. 28 is a similar view with the parts in the "8" position.

Fig. 29 is a similar view with the parts in position to begin a carry or tens-transfer.

Fig. 30 is a similar view but showing the stop emerging from the crown wheel.

Like characters of reference refer to like parts in all views.

Figure 1:
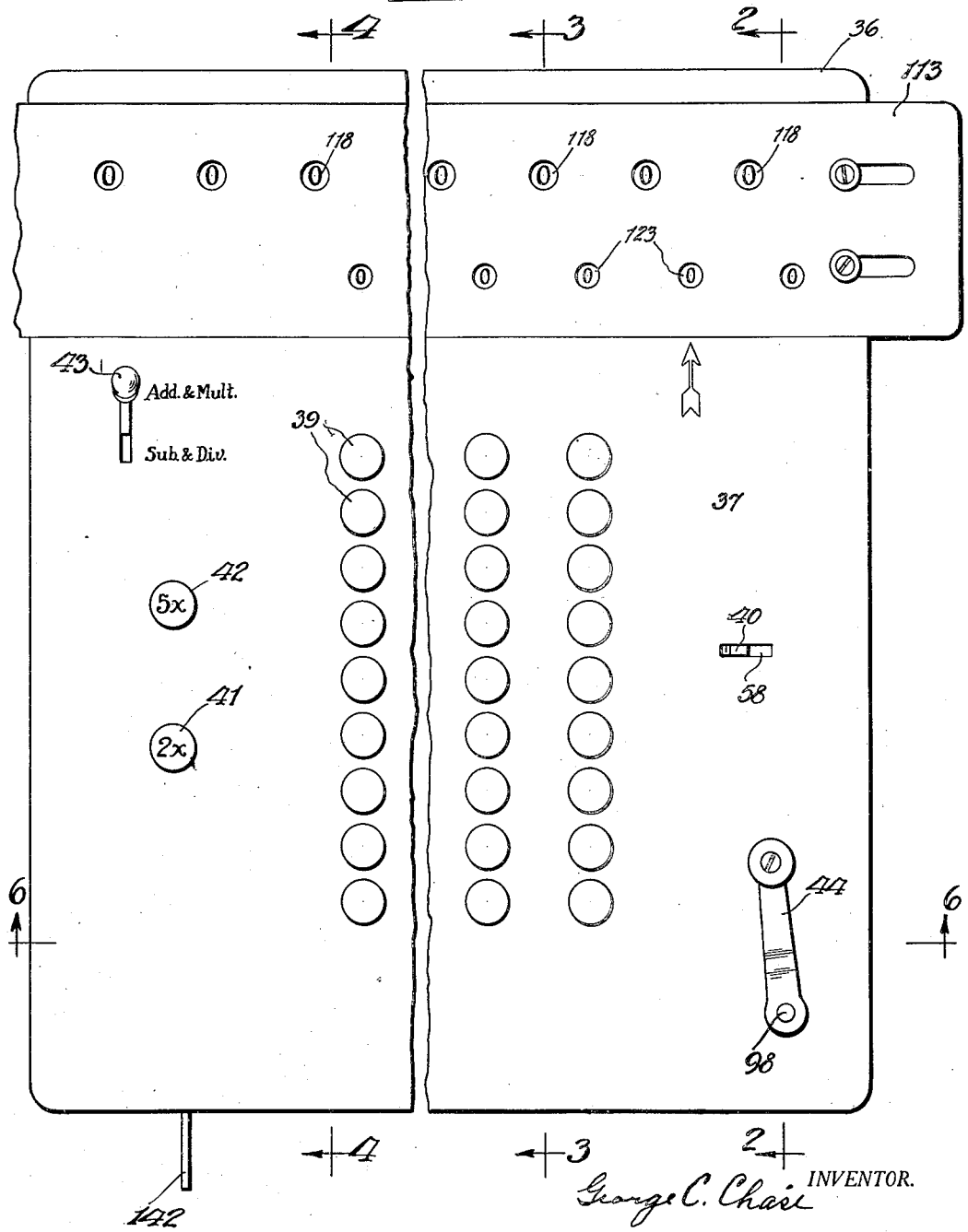
Fig. 1 is a fragmentary top plan view of a machine embodying the invention.

This invention is shown as embodied in a Thomas type machine, altho it is to be considered as merely illustrative, as the invention may be applied to other types of machines with similar effects. In this connection, it may be well to refer to several known Thomas types of machines, as certain of the well known parts of the present machine are not described in detail and reference may be had to such machines for details. Three of the best known patents on this type of machine are the British patent to Charles Xavier Thomas (de Colmar) No. 13,504 of 1851 for calculating machine, the French patent to Thomas de Bojano No. 138,912 dated September 29, 1880, and British patent to Tate No. 65 of 1864.

It is the purpose of the present means to modify the construction of such a machine in such manner that certain of the most used multiplication tables may be accommodated and their products obtained at a single cycle of operation of the machine. Investigation has determined that the three digits most used in multipliers are "1", "2" and "5". Any type of Thomas machine of course, takes care of the "1 times" table as this invoves a mere matter of adding the multiplicand once; and any other digit table may be accommodated by making the desired number of cycles of operation after setting up the multiplicand.

Having in mind the accommodation of a calculating machine to the "2" and "5" digit tables, consider the products in these tables:

| | |
|---|---|
| 2×1= 2 | 5×1= 5 |
| 2×2= 4 | 5×2=10 |
| 2×3= 6 | 5×3=15 |
| 2×4= 8 | 5×4=20 |
| 2×5=10 | 5×5=25 |
| 2×6=12 | 5×6=30 |
| 2×7=14 | 5×7=35 |
| 2×8=16 | 5×8=40 |
| 2×9=18 | 5×9=45 |

Certain characteristics will be noted in these products. (1) The sum of the digits of any product never exceeds nine. (2) The sum of the tens digit of any product and the units digit of any other product of the same table never exceeds nine. (3) There is only one possible significant digit in the tens place of each product of the "2-times" table. (4) There is only one possible significant digit in the units place of each product of the "5-times" table. (5) There are only four different significant digits in the units place of the products in the "2-times" table and these digits are equally spaced two digit values apart,—i. e. they are all even digits. (6) There are only four different significant digits in the tens place of the products in the "5-times" table, and these digits are equally spaced one digit value apart,—i. e. they run from "1" to "4".

Taking advantage of these characteristics and applying them to mechanism, we may note that the "2-times" table, two selectors may be provided for each denominational order except the highest and lowest, one of which selectors may be controlled for four steps, each step controlling a two-unit movement of the associated register, and the other of which selectors may be capable only of being rendered effective and ineffective, and controlling when effective a single unit of movement of its associated register. By making the keys or other setting devices of one denomination control the first selector of its order and the second selector of next higher order, no interference between the partial products of the several orders will be encountered.

In like manner with the "5 times" table, two selectors may be provided for each denominational order except the highest and lowest one of which selectors may be controlled for four steps, each step controlling a single unit movement of the associated register, and the other of which selectors may be capable only of being rendered effective and ineffective, and controlling when effective five units of movement of its associated register. By making the keys or other setting devices of one denomination control the second selector of its order and the first selector of next higher order no interference between the partial products of the several orders will be encountered.

The present machine therefore comprises three selecting means, all operable from the keyboard. Normally, the selector mechanism is operative to enter on the registers the amount set up on the keyboard at a single cycle of operation. By depressing a special key, the normal selecting means is rendered ineffective and a selecting means is called into operation whereby twice the amount set on the keyboard is registered at a single cycle of operation; and by depression of a second key a third selecting mechanism is called into action whereby five times the amount set on the keyboard is registered at a single cycle of operation.

The specific mechanism devised for accomplishing these purposes will now be described.

General

The machine comprises a keyboard mechanism, an accumulator mechanism, actuating mechanism for the accumulators, operating mechanism, and setting mechanism operable from the keyboard for setting the actuating mechanism to cause the registering of the number set up on the keyboard or two times the number set up on the keyboard or five times the number set up on the keyboard at a single actuation of the main operator.

Figure 2:
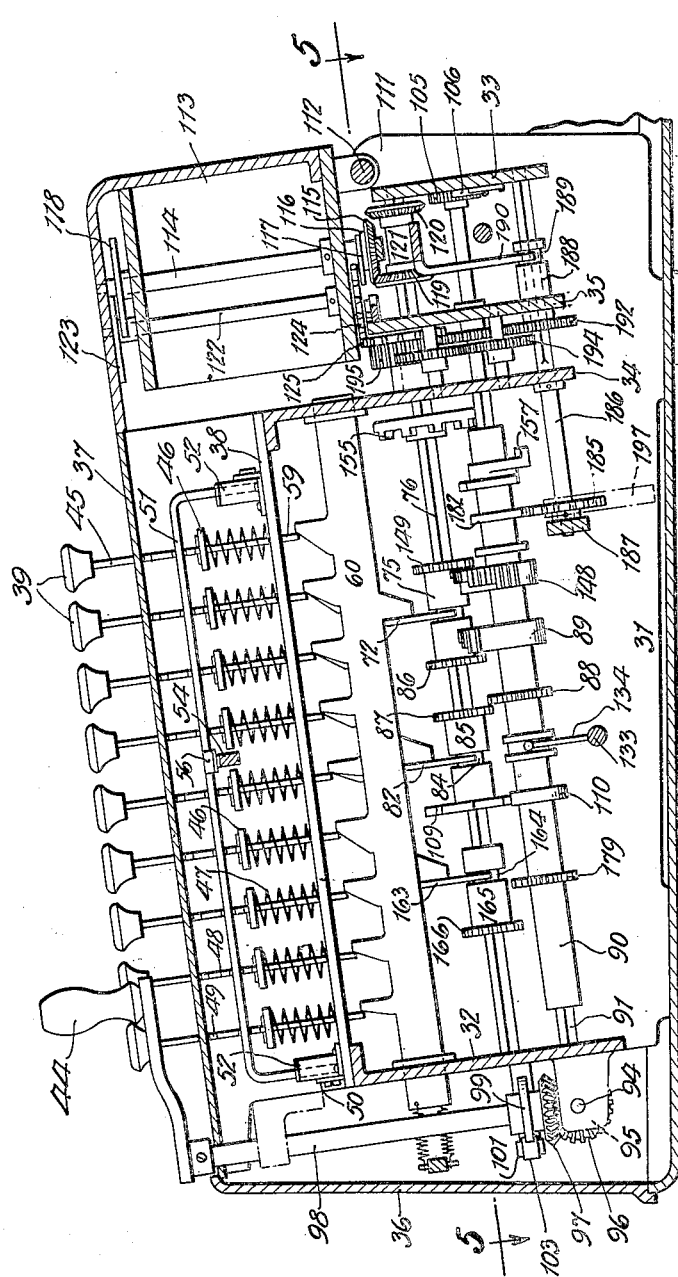
Fig. 2 is a vertical setcional view taken substantially on line 2—2 of Fig. 1.
Figure 5:
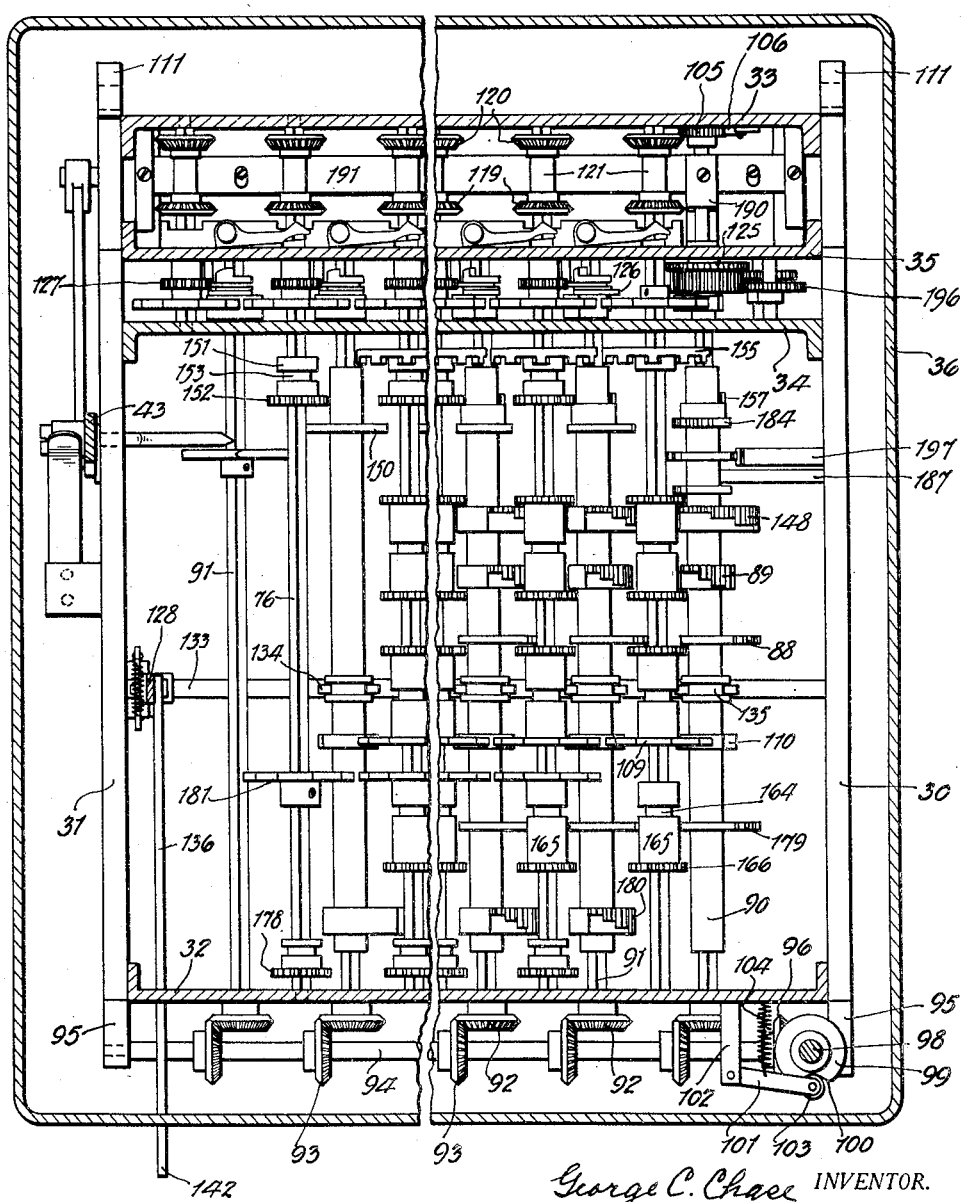
Fig. 5 is a horizontal sectional view taken substantially on line 5—5 of Fig. 2.
Figure 6:
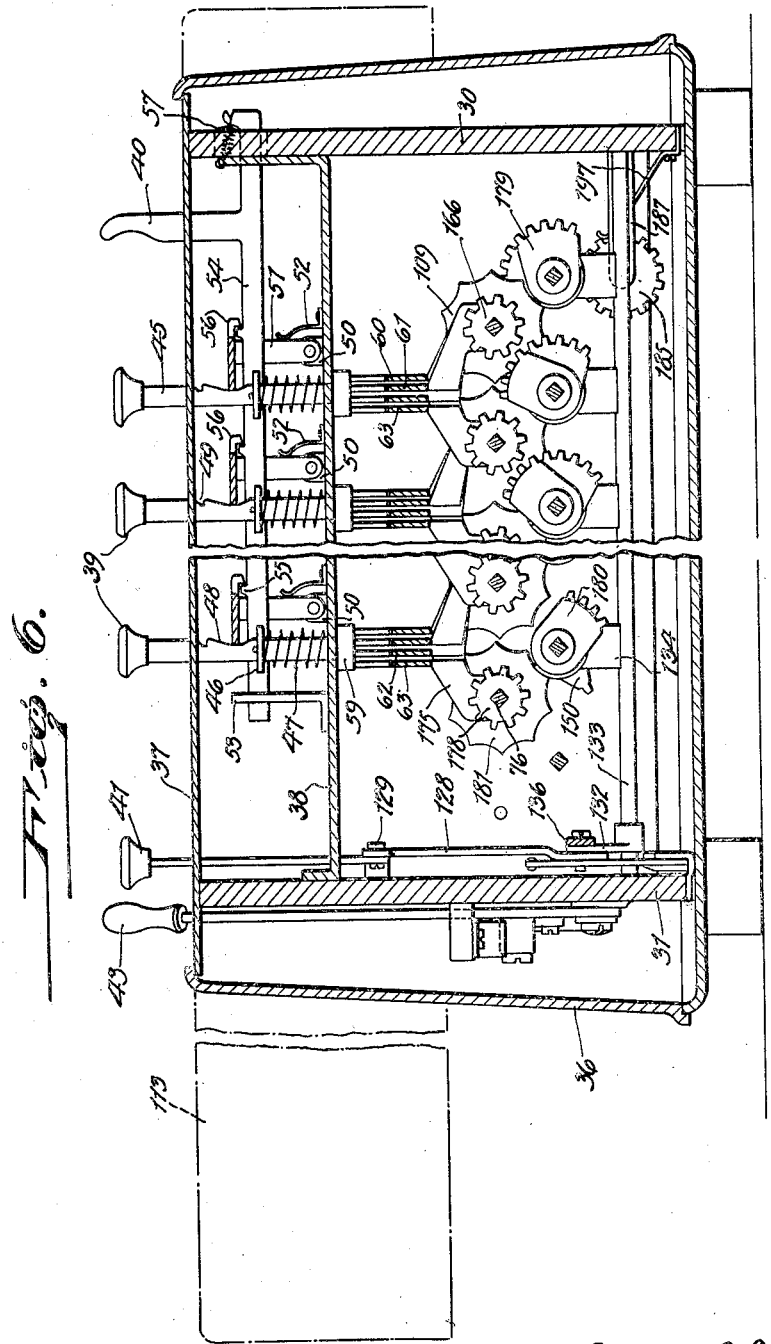
Fig. 6 is a vertical section taken substantially on line 6—6 of Fig. 1.

Framework (Figs. 2 and 5)

The framework of the machine consists essentially of upright side frames 30 and 31, a front frame 32 secured to the front of members 30 and 31, a rear frame 33 secured to the rear ends of members 30 and 31, and two intermediate frames 34 and 35 extending across the machine. A casing is shown at 36 but the form of this is optional with the designer.

The keyboard (Figs. 1, 2, 3, 6)

The keyboard comprises an upper frame member 37 and a lower frame member 38 supported by the main frames 30 and 31 of the machine. Mounted on the keyboard frames are a plurality of digit-setting keys 39 the same being arranged in denominational rows running from front to back of the keyboard, each denominational row including a respective key for each of the significant digits 1–9, inclusive. Mounted in the keyboard is a universal correction key 40 the specific construction and operation of which will be presently set forth. Also mounted on the keyboard are two keys 41 and 42 the first of which sets mechanism in the machine for causing the machine to effect the registration of two times the amount set on the digit keys 39 at a single operation of the general operator, and the second of which effects the setting of mechanism in the machine for causing the accumulators to register five times the amount set on the digit keys 39, at a single operation of the general operator. There is also mounted on the keyboard a shift lever 43 whereby mechanism of the machine may be shifted so as to effect positive and negative registrations at will. An operating handle or general operator 44 is also mounted at the keyboard and operates mechanism to cause the registration by accumulators of amounts set on the digit-setting keys 39 or such amounts modified by the control of the keys 41 and 42.

Figure 3:
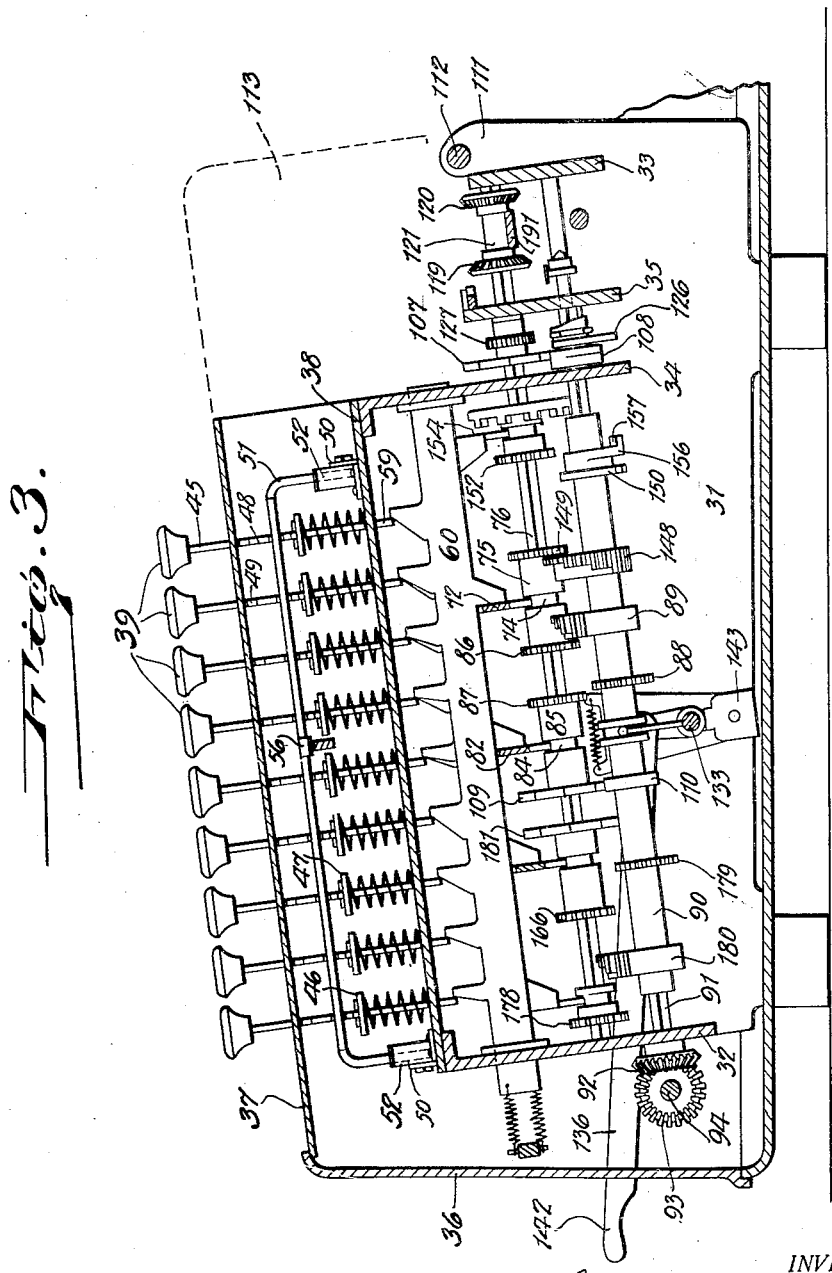
Fig. 3 is a similar view on line 3—3 of Fig. 1.
Figure 4:
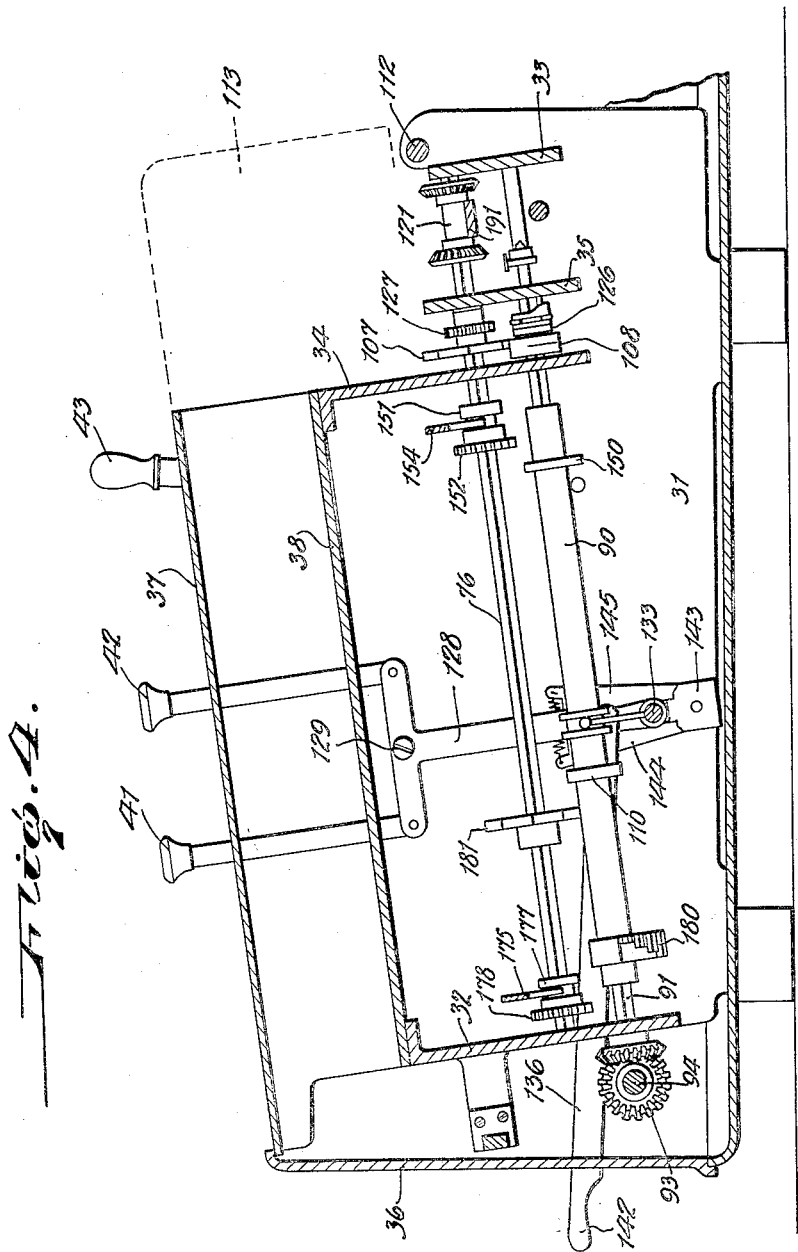
Fig. 4 is a similar view on line 4—4 of Fig. 1.

Digit-setting keys (Figs. 1, 2 and 3)

Figure 7:
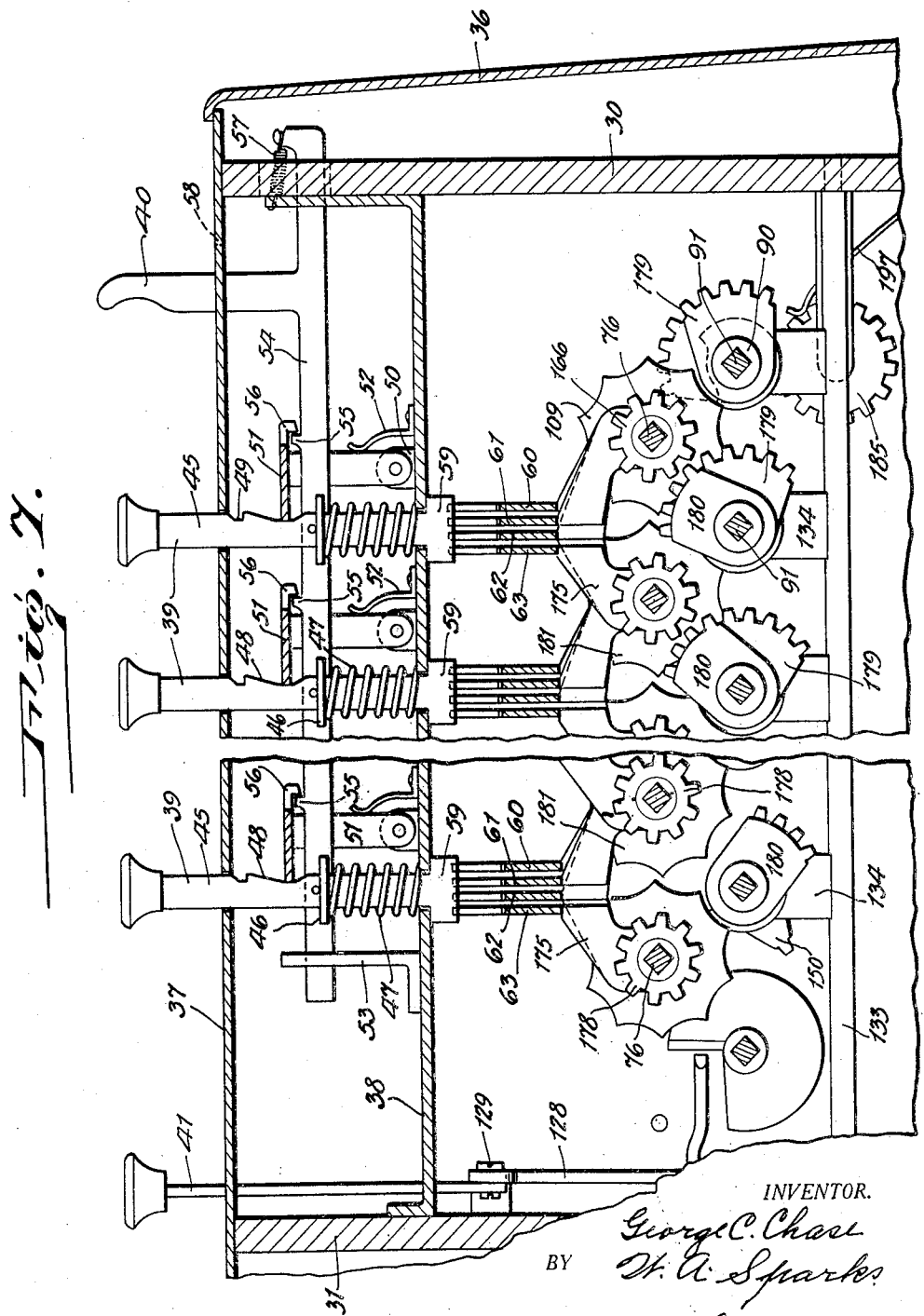
Fig. 7 is an enlarged fragmentary sectional view similar to Fig. 6.
Figure 8:
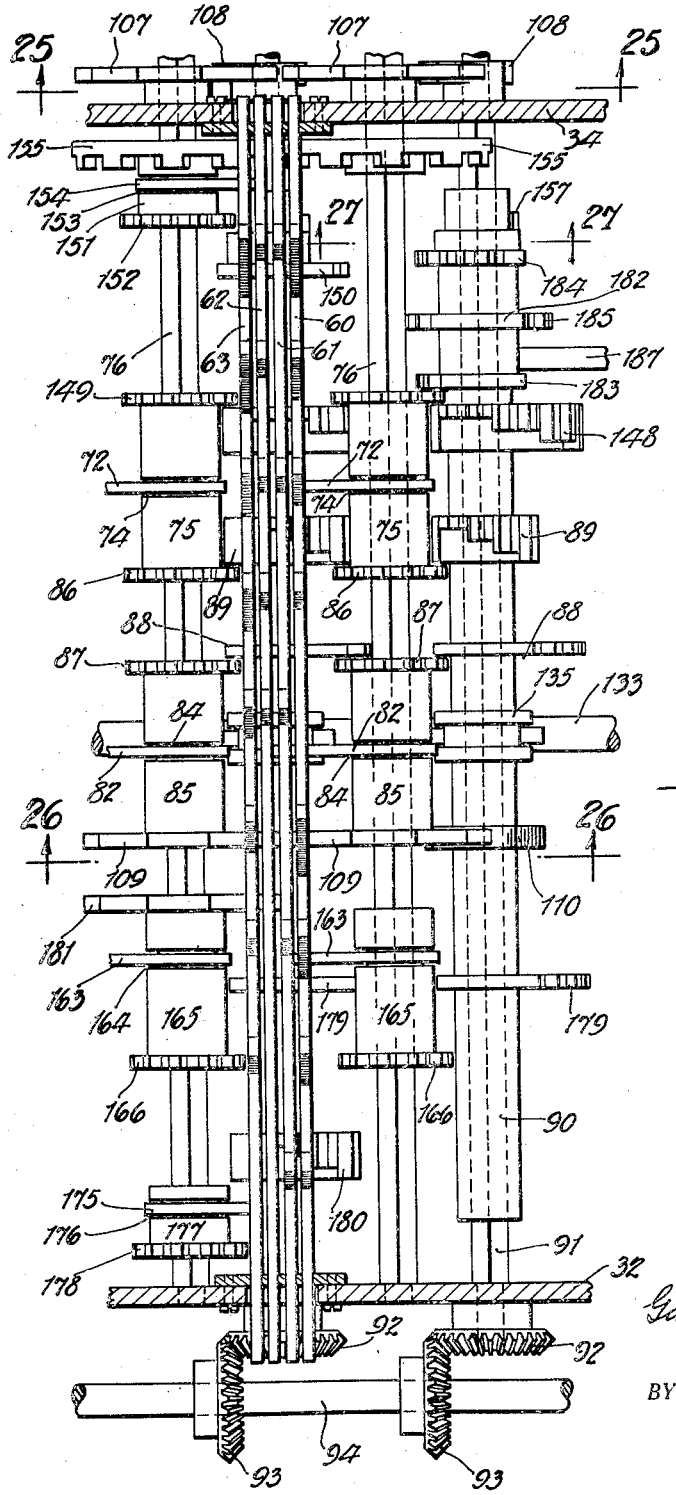
Fig. 8 is an enlarged fragmentary horizontal sectional view similar to Fig. 5 and showing parts in the normal-registering position.

In the drawings only three denominational rows of digit-setting keys 39 are shown, but it is to be understood that more may be employed in the machine if desired. Referring to Fig. 7, it will be seen that each key 39 is provided with a key-stem 45 which is guided in the top and bottom frame plates 37 and 38 of the keyboard. Each stem 45 is provided with a collar 46 and a spring 47 whereby the key is maintained in its upper position with its lower end abutting against the under side of the lower keyboard frame member 38. Each digit-setting key stem 45 is formed with an inclined cam surface 48 terminating at its upper end in a notch 49. Mounted upon the upper surface of the lower keyboard member 38 are ears or brackets 50 to which are pivoted the lower ends of U-shaped locking bales 51. Each locking bale 51 is mounted at the right of a respective row of key-stems 45 and serves as the locking means for the keys of such row. When a key is depressed the cam 48 on its stem rides against the left-hand edge of the cross portion of the locking bale, thereby rocking the locking bale clockwise against the tension of its spring 52 until the notch 49 in the key-stem is brought opposite the edge of the locking bale. The spring 52 then urges the locking bale into engagement with the notch 49 of the depressed key-stem. Should another key of the same denominational row then be depressed the bale 51 would be rocked until it released the formerly depressed key and would then engage with the notch 49 of the last depressed key.

Universal correction key (Figs. 1, 2, 6 and 7)

Slidably mounted in the upturned end of the lower keyboard frame member 38 and in a bracket 53 is a releasing bar 54 which extends cross-wise of the machine and is formed with a plurality of lugs or teeth 55, one tooth for each of the locking bales 51 and normally just to the left of a turned down lug 56 of the locking bale 51. A spring 57 tends constantly to shift the bar 54 towards the left-hand side of the machine, the movement of the bar 54 being limited by the ends of a slot 58 in the upper keyboard frame member through which slot a finger of the slide 54 extends forming the universal correction key 40. In order to clear the keyboard (i. e. release all of the digit-setting keys 39), the operator presses the finger piece 40 to the right, thereby moving the slide 54 also toward the right, whereby the lugs 55 are caused to engage the lugs 56 of the several locking yokes and rotate the yokes sufficiently to release any depressed digit keys.

Differential actuating mechanism (Figs. 2, 3, 4, 7, 8, 11, 12, 15 and 16)

The differential actuating mechanism of this machine cooperates with the two and five multiplying devices later to be described, but it will be simpler to consider it at first only in connection with its normal registering functions.

Mounted in suitable apertures in the front frame 32 and intermediate frame 34 are a plurality of slides. There are four of these slides for each denominational row of digit-setting keys 39 and arranged directly below the lower broadened ends 59 of the key-stems of the respective row. The four bars for any denominational row differ from each other, but the four bars of any one denominational row are duplicated for each of the other rows. The four different bars are indicated by the reference numerals 60, 61, 62 and 63 respectively, and are shown in detail in Figs. 11 to 18, inclusive, of the drawings. Only bars 60 and 62 have any effective control during simple adding and subtracting operations, and only these bars will be considered in detail for the present.

The bar 60 is provided with eight cam-lugs 64, 65, 66, 67, 68, 69, 70 and 71 on its upper edge which stand in position to be operated, respectively, by the ends 59 of the "1", "2", "3", "4", "6", "7", "8" and "9" keys respectively. The pitch of the cams 64 and 68 is the same so that depression of either the "1" or the "6" key will give the same amount of longitudinal movement to the bar 60. Likewise cams 65 and 69 are the same, and move bar 60 twice as far as cams 64 or 68. Also cams 66 and 70 are alike and will effect three times the amount of movement of bar 60 that cams 64 or 68 can effect. Cams 67 and 71, too, are alike and either will cause 60 to move four times as far when the respective key is depressed as cams 64 or 68 would. Thus the bar 60 of each denominational row may be moved to any one of four active positions by depression of the proper key of its respective row.

Each bar 60 is formed with a laterally extending portion 72 which extends toward the right and terminates in a bifurcation the fingers of which enter a groove 74 in a sleeve 75 slidably mounted on a respective denominational actuator shaft 76. Each shaft 76 is connectible by means to be later described with an accumulator or register, and is mounted for rotation in bearings in the frames 32, 33, 34 and 35.

The shafts 76 are preferably square in cross-section so that sleeves 75 may slide longitudinally thereon, but rotation of any sleeve 75 will cause a corresponding rotation of the respective shaft 76.

Turning now for a moment to the bars 62 which are the only other bars doing effective work in simple addition and subtraction, it will be seen in Figs. 15 and 16 that each of these bars is formed with five cams 77, 78, 79, 80 and 81 adjacent to and operable respectively by the broadened portions 59 of the "5", "6", "7", "8", and "9" keys. These five cams have exactly the same angle, so that depression of any one of the five correlated keys will effect a single step of movement of the bar 62, or in other words, each bar 62 has only two positions of rest, a normal or ineffective position and an effective position. This bar 62 has also a portion 82 extending toward the right and terminating in a bifurcation the fingers of which enter a groove 84 in a sleeve 85 also slidably mounted on the actuator shaft 76 of the respective denominational order.

It will now be seen that depression of the "1", "2", "3" or "4" key of any row will result in the moving of the bar 60 and sleeve 75 for that row one, two, three or four steps without effecting any movement of bar 62 and sleeve 85; that depression of the "5" key of a row will result in moving bar 62 and sleeve 85 for that row to effective position without causing any movement of the bar 60 and sleeve 75; and that depression of the "6", "7", "8" or "9" key of a row will result in moving bar 62 and sleeve 85 for that row to effective position, and bar 60 and sleeve 75 for that row, one, two, three, or four steps.

Mounted on sleeve 75 is a gear pinion 86 preferably formed with ten teeth, and mounted on sleeve 85 is a similar gear pinion 87. Normally, gear pinion 87 stands just forwardly of a five-tooth gear 88, and when it is moved by its bar 62 upon depression of one of the related keys "5" to "9" inclusive, it is brought into the same plane with gear 88 and may be actuated by rotation of the latter.

The pinion 86 normally stands just forwardly of a four-tooth gear 89, the teeth of which are arranged in step-formation so that if sleeve 75 is moved rearwardly one step by depression of the "1" or "6" key of the respective row and consequent movement of bar 60, the pinion 86 will be moved rearwardly just far enough to be engaged by one tooth of the gear 89 upon rotation of the latter. Similarly depression of the "2" or "7" key of the respective row will move sleeve 75 far enough to bring pinion 86 into operative relation with two teeth of gear 89; depression of the "3" or "8" key will effect movement of sleeve 75 to bring pinion 86 into operative relation with three teeth of gear 89; and depression of the "4" or "9" key will effect sufficient movement of sleeve 75 to bring pinion 86 into operative relation with all four teeth of gear 89.

The gears 88 and 89 for each row of keys are secured to a sleeve 90 so as to be immovable either longitudinally or axially with relation to such sleeve, and while the sleeves are movable longitudinally of their square-shafts 91, for a purpose to be set forth later, they may be considered for the purpose of simple addition and subtraction as fixed on their shafts. The gears 88 and 89 are so set on the sleeves 90 that the teeth of the gears 89 take effect on pinions 86 first upon rotation of shafts 91 and the fourth or broadest tooth of each gear 89 is immediately followed by the first tooth of the respective gear 88. Thus if a "9" key has been depressed so as to bring pinion 86 into operative relation with all of the teeth of the respective gear 89, and the respective pinion 87 into operative relation with its gear 88, and the shaft 91 of these gears is given a rotation, the four teeth of gear 89 will effect a four-tooth movement of pinion 86 and then the five teeth of gear 88 will turn pinion 87 five teeth, whereby actuator shaft 76 will be given a nine-tooth movement and will effect a corresponding or nine-unit actuation of the engaged register.

Furthermore, the gears 88 and 89 on each shaft 91 are set one tooth farther ahead than the gears of the shaft for the next higher denominational order. That is, the gears of lowest order take effect first and are followed by the gears of higher orders seriatim at one-tooth intervals. This is to lighten the load on the machine and to provide for proper carrying or tens-transfer as is well understood in the art.

*Driving mechanism (Figs. 1, 2, 3 and 5)*

The several shafts 91 have their bearings in the main frames 32, 34 and 35 and forwardly of the frame 32, each shaft 91 is provided with a miter-gear 92 pinned or otherwise secured to it. The several miter-gears 92 mesh with respective miter-gears 93 carried by and pinned to a cross shaft 94 having its bearings in extensions 95 of the frame members 30 and 31. Secured to the right-hand end of shaft 94 is a miter-gear 96 which meshes with a similar gear 97 on a vertical shaft 98 which carries the driving crank or operating handle 44. Through this train of mechanism rotation of the main operating crank effects rotation of the several shafts 91, the ratio of the driving gears being 1-to-1 so that one rotation of the driving crank 44 effects one revolution of all of the shafts 91.

Mounted on the vertical shaft 98 is a disk 99 having a notch 100. A swinging arm 101 is pivoted on a bracket 102 secured to the front face of the frame 32. The arm 101 carries a roller 103 which rides on the periphery of disk 98 and is pressed thereagainst by a spring 104. When the roller 103 drops into the notch 100 it offers a slight resistance to rotation of handle 44 thereby indicating to the operator that the parts have come to normal or full-cycle position, as is well known in the art.

Secured to the shaft 91 of lowest order is a five-tooth ratchet wheel 105 with which cooperates a pawl 106 pivoted to the rear frame. This pawl 106 and ratchet device enforce a one-way operation of the crank 44, as is also well known in the art.

Figure 25:
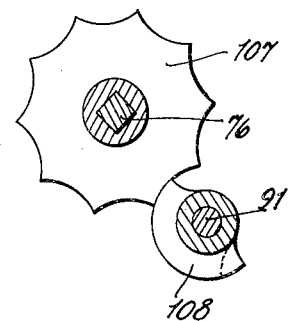
Fig. 25 is a detail front elevation of a "normal nine-stop" mechanism substantially on line 25—25 of Fig. 8.
Figure 26:
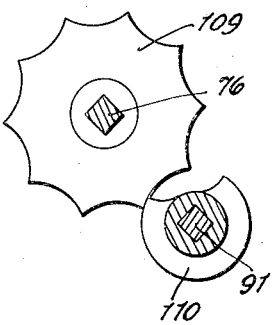
Fig. 26 is a similar view of a "normal four-stop" mechanism substantially on line 26—26 of Fig. 8.

*The normal nine stop (Figs. 3, 8 and 25)*

Means are provided for locking each actuator shaft 76 as its correlated gear 88 passes out of effective position during operation of the machine and to maintain the shaft locked against rotation until the correlated shaft 91 has been rotated sufficiently to bring the first or narrowest tooth of its gear into effective position. This means consists of a Geneva-stop device which will now be described. Mounted on each actuator shaft 76 for rotation therewith, is a scalloped wheel 107 having ten scallops; and mounted on each shaft 91 for rotation therewith is a concentric lug 108 which enters one of the scallops of respective wheel 107 as the last tooth of its gear 88 completes its work, and remains in the scallop until the next cycle of operation brings the first tooth of its gear 89 to effective position. Such mechanisms are old in Thomas type machines.

*The normal four-stop (Figs. 2, 3, 5, 8 and 26)*

Means are provided for locking each of the actuator shafts 76 against rotation during simple adding or subtracting operations as the fourth or broadest tooth of its gear 89 passes out of its active zone with respect to pinion 86 in cases where a key of the value "1", "2", "3" or "4" has been depressed; and means are provided to render this stop mechanism ineffective when a "5" key or a key of higher digital value is depressed.

Secured to each sleeve 85 of the several actuator shafts 76 is a scalloped disk or wheel 109; and mounted on, for rotation with, each sleeve 90 is a stop disk 110 having a concentric stop portion, the disk 109 and stop 110 of each denomination normally lying in the same plane. The low portion of each stop disk 110 is of such diameter that the corresponding scallop-disk may turn freely when this low portion is toward it. However, when shaft 91 is rotated it will bring the high portion of stop 110 into one of the scallops of the wheel or disk 109 and prevent further rotation thereof, and consequently rotation of the shaft 76 thereof is prevented until the stop 110 moves out of engagement. The stop 110 is so arranged on the sleeve 90 that it comes into operative engagement with the scallop-disk 109 during the effective movement of the fourth or broadest tooth of the corresponding gear 89 and remains effective until the normal nine-stop mechanism above described becomes effective. Thus if the sleeve 85 remains in normal position, the corresponding shaft 76 will be locked against possible overrotation by the gear 89.

But when a "5" key or a key of higher digital value is depressed, it will be remembered that the sleeve 85 is shifted to bring pinion 87 into the plane of gear 88, and this shifting of sleeve 85 moves the scallop-disk 109 thereof out of the plane of its cooperative stop disk 110. Hence when a key of a digital value of "5" or more is depressed, the corresponding "four-stop" device is rendered ineffective.

*The registering mechanism (Figs. 1, 2 and 3)*

The side frames 30 and 31 are extended rearwardly at 111 to form bearings for the hinge rod 112 of the carriage. Secured to the hinge rod 112 by ears or other suitable means is the carriage 113. Mounted in bearings in the carriage 113 are a plurality of accumulator or register shafts 114, one for each denomination of the desired capacity of the machine. Mounted on each shaft 114 is a register gear 115, a clearing cam 116, a tens-carry trip finger 117 and a register dial 118. The dials 118 are formed with indicia on their faces, which indicia may be read thru dial openings in the top plate of the carriage as is well understood in the art. Any suitable well known means may be used to prevent displacement of the dials when the carriage is thrown back for shifting from one denomination to another.

The functioning of the tens-carry fingers 117 will be explained somewhat more fully in a later section but such mechanisms are old and well known in Thomas type machines. The clearing or zeroizing cams 116 coact with means operable by a handle when the carriage is turned back to effect clearing of all the dials in a manner old and well known in the art.

The gears 115 are adapted to engage adding gears 119 or subtracting gears 120 mounted on sleeves 121 on the respective actuator shafts 76 and shiftable by well known means operable by shift lever 43.

The gears 119 and 120 being engageable with opposite sides of the register gears 115 and the actuator shafts 76 being always turned in the same direction, it is obvious that when gears 119 mesh the register gears 115 the latter will be turned in one direction, and when gears 120 mesh the register gears 115 the latter will be turned in the opposite direction by any rotary movement of the actuator shafts 76.

By throwing the carriage back the gears 115 are freed from the actuator gears, and the carriage may then be moved to a different decimal position. The carriage when turned down again must be in proper position to effect engagement of gears 115 with the effective gears 119 or 120; and this is enforced by means already well known in the art.

The carriage 113 also supports a number of shafts 122 of counter dials 123. The upper surfaces of the dials 123 bear indicia readable through dial openings in the top plate of the carriage. The counter shafts carry gears 124 for engagement with a gear 125. There being only one gear 125, only one dial 123 is operated at a time, the dial operated at any particular time being determined by the decimal position of the carriage. The means for operating gear 125 will be fully set forth in a later section to be devoted exclusively to counting. The several shafts are also provided with counter-clearing cams cooperative with a bar operable by a handle for effecting clearing or turning to zero all of the counter dials, in a manner well known in the art.

Carrying or tens-transfer (Figs. 3, 5, 8 and 25)

Means are provided for effecting carrying of one (either positive or negative) whenever a registering dial passes from "9" to "0" or from "0" to "9". This is effected by the operation of the carry fingers 117 above described which fingers act upon mechanism well known in the art whereby the normal stop 108 of next higher order, is moved slightly rearward.

Each normal stop 108 is connected to an operating finger 126 serving the purpose of a single-tooth gear and which finger 126 normally stands forwardly of a gear 127 on the associated actuator shaft 76. The normal stop 108 of each of the higher orders is made broader than that of the lowest order shaft 91 and is cut away at the forward portion in line with the carry tooth 126, so that when it is moved rearwardly bringing the carry tooth or finger 126 into operative relation with gear 127, the forward portion of the stop 108 coming into cooperative relation with the scallop wheel or disk 107 permits a further movement of one tooth to the associated actuator shaft 76 for carrying after which stop 108 engages wheel 107 to prevent further movement of shaft 76. The tooth 126 engages the gear 127 directly after the final or fifth tooth of gear 88 is effective, and when carrying occurs forms substantially a tenth tooth on the intermediate shaft 91. Cam means for moving stop 108 and tooth 126 back to normal are well known in the art.

Now having described all the mechanism necessary for simple adding and subtracting operations, I shall take up the multiplying and dividing mechanisms.

The 2X and 5X setting mechanism (Figs. 1, 4, 5, 6 and 19)

The keys 41 and 42 above mentioned as arranged at the keyboard are provided with stems guided in suitable slots in the keyboard frames 37 and 38. The inner ends of the stems of keys 41 and 42 are pivotally attached to respective arms of a three-armed rock-lever 128 pivoted at 129 to a stud extending from the frame member 31. (The keys 41 and 42 may be referred to, respectively, as the "2X" and "5X" keys as contractions of the expressions "2 times" and "5 times"). The lever 128 is T-shaped, and depression of the 2X key rocks the depending arm of this lever rearwardly whereas depression of the 5X key rocks the depending arm forwardly.

The lower arm of lever 128 is formed with an open slot 130 through which extends a pin 131 secured to an arm 132 fixed on a rock shaft 133. Mounted on the shaft 133 are a plurality of sleeve-shifting members 134, one for the sleeve 90 on each intermediate shaft 91, and each having its upper end bifurcated and the forks entered between the flanges of a collar 135 pinned or otherwise fixedly secured to the respective sleeve 90.

Pivotally secured at its rear end to the arm 132 is a forwardly extending bar 136 provided on its lower edge with front and rear shoulders 137 and 138, respectively, adapted to drop in back and in front, of a square bar 139 fixed to and extending inwardly from the side frame 31. A spring 140 tends constantly to rock the front end of bar 136 downwardly. When the 2X key is depressed the shoulder 137 comes into engagement with bar 139 thereby holding the shaft 133 in its rocked position, and when the 5X key is depressed the shoulder 138 engages bar 139 for a similar purpose.

Mounted on the driving shaft 94 is a cam 141 which is arranged in the plane of the bar 136 and at each operation lifts the front end of bar 136 so as to release this bar from the stop-bar 139. The bar 136 extends thru and is guided by the front wall 32 of the machine, and carries a finger-piece 142 which may be operated to release bar 136 from stop 139 in case it is desired to do so without operating the main shaft.

The centralizer (Figs. 4, 5, 19 and 20)

Means are provided for centralizing the shaft 133 and connected parts when neither the 2X nor the 5X key is depressed.

Pivoted to a bracket 143 secured to the frames 31 are two upright centralizer arms 144 and 145 which rise in front and rear, respectively of the rock-shaft 133 with their upper ends connected by a spring 146 drawn toward each other into engagement with the pin 131. The bracket is extended upwardly and formed with fingers 147 which prevent either of the arms 144 and 145 from moving into contact with the rock shaft 133.

When the 2X key is depressed, arm 145 is rocked rearwardly by the action of pin 131 and the arm 144 remains in contact with its finger 147. When the parts are released by operation of the machine or otherwise, spring 146 draws arm 145 and the pin 131 and connected parts back to normal central position. In like manner, if the 5X key is depressed, arm 144 is rocked forwardly and arm 145 remains in contact with its finger 147, and when the release occurs, the parts are drawn back to normal by spring 146.

Separate mechanisms are rendered effective by the 2X and 5X keys, and as the 2X mechanism more nearly parallels the normal adding mechanism, I shall describe this first.

The 2X mechanism (2, 3, 5, 6, 7, 8, 9, 15 and 16)

Mounted on each sleeve 90 except that of highest order is a stepped gear 148 having eight teeth arranged in four steps, two teeth to each step; and mounted on the rear end of each sleeve 75 except that of highest order is a pinion 149 preferably formed with ten teeth, but in any case a duplicate of pinion 86 of the simple adding devices.

Fixed on each sleeve 90 except that of lowest order is a single-tooth gear 150, and slidably mounted on each actuator shaft 76 except that of lowest order is a sleeve 151 which carries a pinion 152. Each sleeve 151 is formed with a groove 153 into which extends a finger 154 carried by the bar 62 cooperating with the row of keys of next lower order.

Figure 9:
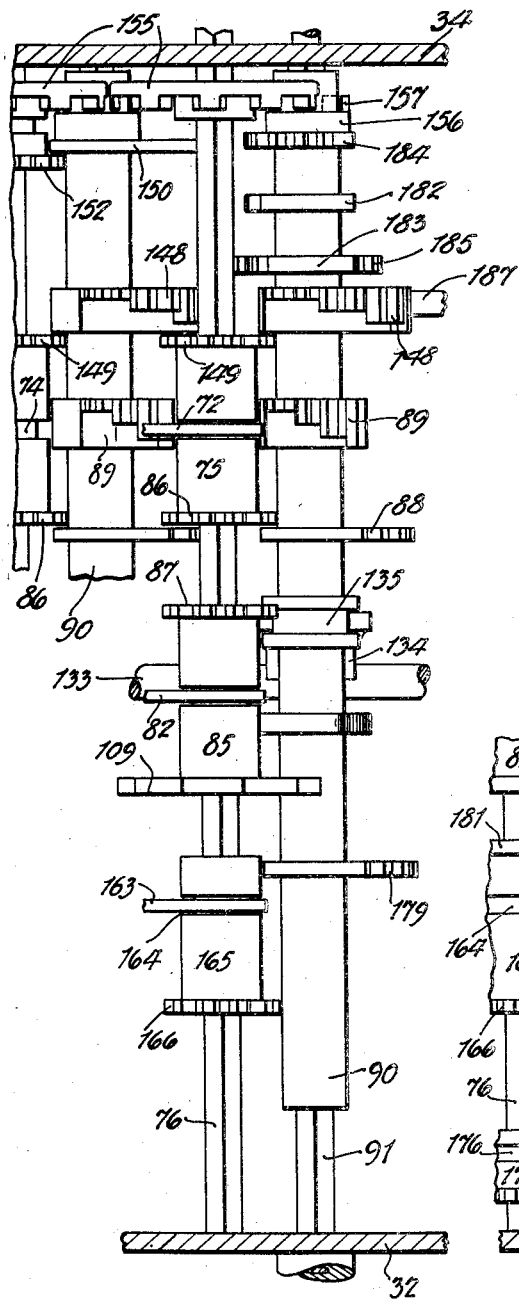
Fig. 9 is a similar view showing parts in the "2X" position.
Figure 10:
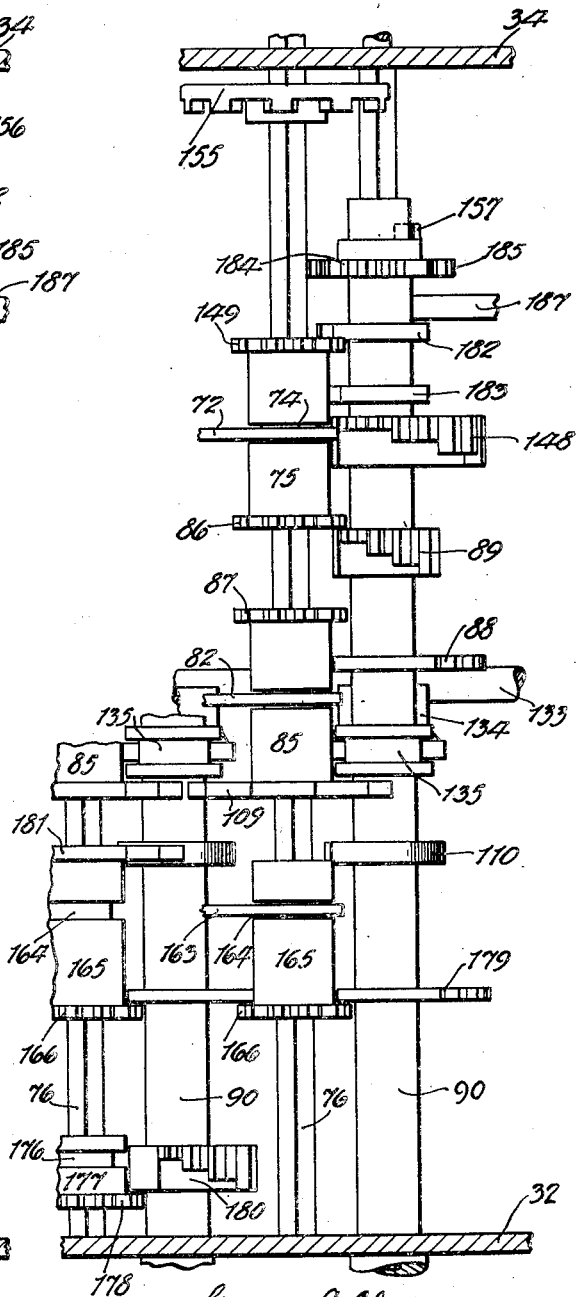
Fig. 10 is a similar view showing parts in the "5X" position.
Figure 11:
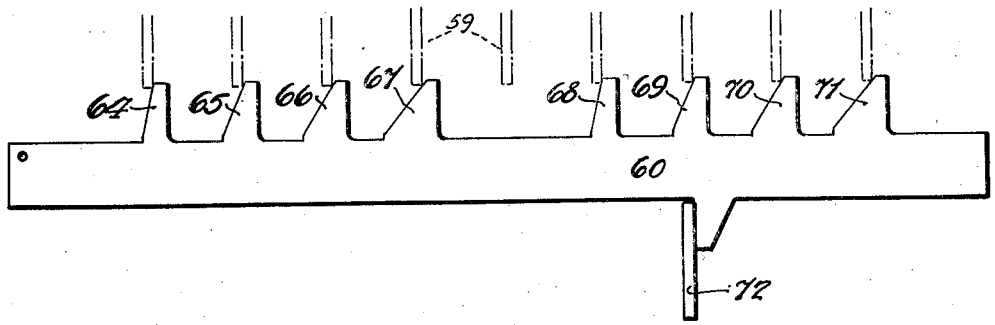
Figure 12:
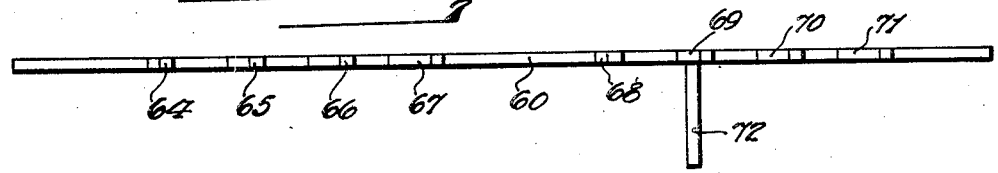
Figure 13:
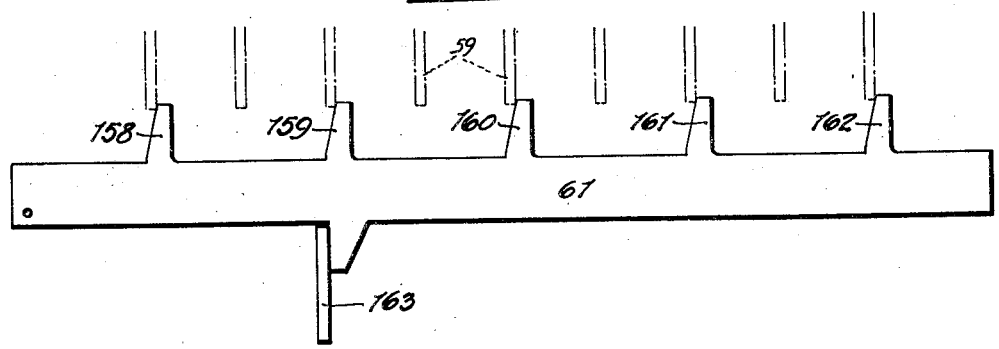
Figure 14:
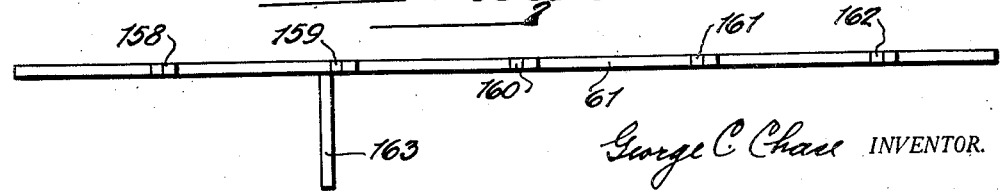
Figure 21:
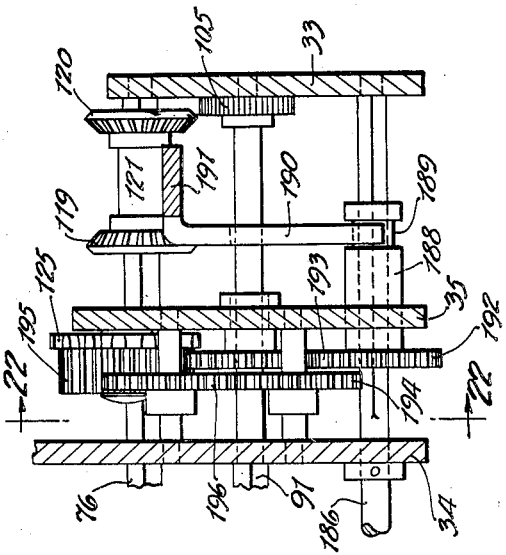
Fig. 21 is an enlarged detail sectional view of the counter-operating gearing.
Figure 22:
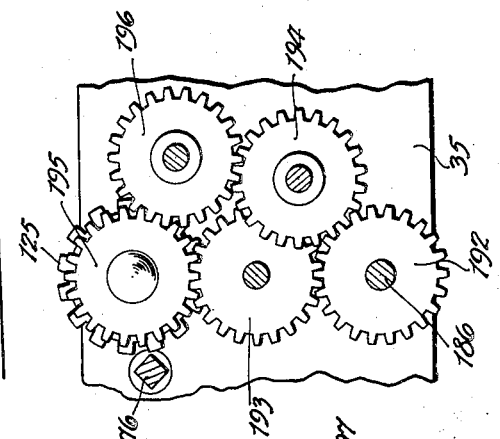
Fig. 22 is a view substantially on line 22—22 of Fig. 21.
Figure 23:
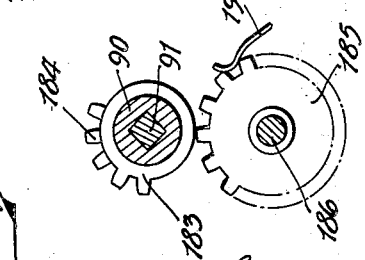
Fig. 23 is a detail front elevation of the counter-actuating segments and associated gear.

The operation of the 2X mechanism is as follows: First the 2X key 41 is depressed whereby all of the sleeves 90 will be moved rearwardly. This brings the parts into the position shown in Fig. 9 wherein it will be noted that the four-tooth gear 89 and the five-tooth gear 88 have been moved so far to the rear that depression of any numeral key cannot move the pinions 86 and/or 87 of the simple adding mechanism into cooperative relation with the respective gears 88 and 89. The gears of the 5X mechanism (to be described later) are also moved to an ineffective position; but the gears 148 and 150 of the 2X mechanism have been moved so that they stand just slightly in rear of the pinions 149 and 152, respectively.

The required digit-setting key 39 is now depressed and if this key is the value "1" or "6", the cooperating slide bar 60 will effect a movement of sleeve 75 sufficient to bring pinion 149 into the path of movement of the first or two-tooth step of gear 148 so that upon subsequent operation of the machine, the accumulator corresponding with that row of keys will be actuated to register "2", that being the number of units in the products "2" and "12". In like manner if a "2" or "7" key is depressed, sleeve 75 will be moved to bring its pinion 149 opposite the second step (or four teeth) of gear 148, "4" being the units digit of the products "4" and "14"; if a "3" or an "8" key is depressed, the corresponding sleeve 75 will be moved to bring pinion 149 into the zone of action of the third step (or 6 teeth) of gear 148, "6" being the units digit of the products "6" and "16"; and if a "4" or "9" key is depressed, the corresponding pinion 149 will be moved into the zone of movement of the rearmost step (or 8 teeth) of gear 148, "8" being the units digit of the products "8" and "18". The several products mentioned are, of course, obtained by multiplying by two the value of the digit setting key depressed.

It is, of course, to be noted that it is immaterial whether the digital keys 39 or the controlling keys 41 and 42 are set first, but for the purpose of this description it appears simpler to consider a certain routine of operation.

However, when a digit key 39 of the value "5" or of higher value is depressed, a product having a tens digit as well as a units digit is produced. In the case of the 2X mechanism this tens digit is always "1". Now when a key 39 of the value "5" or of higher value is depressed, it will be recalled that the bar 62 cooperating with such key will be moved one step. This bar carries lateral element 154 which will therefore move the pinion 152 of next higher order one space thereby bringing such pinion into the same plane as the single-tooth gear 150.

Thus if a key 39 of the values "1" to "4" is depressed only the pinion 149 of that order will be moved, and such movement will be in accordance with the value of the depressed key; if the "5" key is depressed, only the pinion 152 of next higher order will be moved; while if a key of the values "6" or "9" is depressed, the corresponding order pinion 149 will be moved according to the value of the key and concomitantly the pinion 152 of next higher order will be moved one space.

After the desired digit keys have been set, effecting the above stated results, the operating crank 44 is given one complete rotation whereby the gears 148 and/or 150 are rotated to effect the necessary registration of two times the number set on the keyboard. This registration may be in either a positive or negative direction according to the position of shift lever 43.

The single tooth of gear 150 is set to become effective directly after the final broad tooth of gear 148 on the same shaft.

*The 2X stop (Figs. 8, 9, 10, 27–30)*

Means are provided to prevent overthrow of shaft 76 in cases where the pinion 148 is actuated without pinion 152 being actuated, as in cases where a digit key of the values "1" to "4" is depressed; and means are also provided for rendering this stop mechanism ineffective in cases where both pinions 148 and 152 or pinion 152 only, are/or is operative during a single cycle of operation of the machine.

Pinned directly to the actuator shaft 76 of lowest order, and secured to the rear end of the sleeve 151 on the actuator shafts of higher order except the sleeve 151 operated by the keys of highest order, is a respective crown-wheel 155 and secured to each sleeve 90 except that of next higher order to the highest order of number keys, and near the rear end of such sleeve is an arm 156 carrying a stop lug 157. Normally, or when the machine is in condition for simple addition and subtraction, the arm 156 is positioned so far forwardly that its lug 157 cannot coact with the crown wheel 155; but when the 2X key is depressed the consequent rearward movement of sleeves 90 brings all of the arms 156 to a position where their lugs 157 are in the planes of the teeth of crown wheels 155. Incidentally the "four-stop" member 110 is shifted out of cooperative relation with scallop wheel 109.

Upon depression of a setting key of the values "1" to "4" with sleeves 90 in the 2X position, and subsequent rotation of the operating lever, the actuator shaft 76 is rotated according to the control of pinion 149 and gear 148 and as the last tooth of gear 148 completes its action on pinion 149 one of the stop-teeth of crown-wheel 155 will engage with the stop 157 which has been moved to active position, and rebound of the crown-wheel will also be prevented by the stop 157 being between teeth of the crown-wheel. As the operation progresses, during the moment before the normal nine-stop 108 becomes effective, the lug 157 passes thru the space between the teeth of crown wheel 155 and the actuator shaft 76 is again free, as far as the 2X stop mechanism is concerned, so that this shaft may be rotated for carrying if necessary. The lug 157 moves inside the crown-wheel 155 during the time necessary to effect a carry— or tens—transfer, and then moves out thru the teeth of the crown wheel preparatory to another registering operation. From the above, it will be seen that this stop device is effective only between the eight and nine positions when it is effective at all.

When, however, a key of the value "5" or any higher digital value, is depressed, the sleeve 151 of next higher order is moved rearwardly thereby removing the associated crown-wheel out of coacting relation with its lug 157, so that the 2X stop is not effective except in the lowest order. The reason why the 2X stop is always effective in the lowest order during 2X operations is that the lowest order actuator shaft 76 is never turned more than eight teeth; and the reason why the shaft of next higher order to the highest order of numeral key is not provided with 2X stop mechanism is that this shaft is never turned by a gear 148 during 2X operations.

*The 5X mechanism (Figs. 2, 3, 5, 6, 7, 8, 10, 13, 14, 17 and 18)*

As has hereinbefore been stated there is a group of four bars 60, 61, 62, and 63 for each order of digit keys 39 and operable thereby. The operation and functions of bars 60 and 62 have already been described, and now the construction and operation of bars 61 and 63 will be considered, as these two bars control the 5X devices.

Each bar 61 is provided with five lugs 158, 159, 160, 161 and 162 all of which are of the same incline and which are disposed so as to be operable by the "1", "3", "5", "7" and "9" keys, respectively. Hence, when one of these keys is depressed, regardless of which one, the bar will be given a step of movement rearwardly. Each bar 61 has a shift member 163 formed integrally with it and extending toward the right, its end being bifurcated and the fingers of this bifurcation entering a groove 164 in a sleeve 165 slidably mounted on the actuator shaft of the same order as the row of digit-setting keys 39 associated with the bar, and carrying a gear pinion 166.

Each bar 63 is formed with eight cam lugs 167, 168, 169, 170, 171, 172, 173 and 174 operable respectively by the "2", "3", "4", "5", "6", "7", "8", and "9", keys of its row; and also formed with a shift member 175 extending toward the left, the end of member 175 being bifurcated and the fingers of the bifurcation entering a groove 176 cut in a sleeve 177 slidably mounted on the actuator shaft of next higher order and carrying a pinion 178. The cams on the bar 63 are formed with such angles that depression of either the "2" or the "3" key will effect one step of movement of the correlated bar 63, sleeve 177 and pinion 178; depression of either the "4" or the "5" key will effect twice as much movement of bar 63, sleeve 177 and pinion 178, as is caused by the "2" or "3" key; depression of either the "6" or "7" key will effect three times the amount of movement of the said parts; and depression of either the "8" or "9" key will effect four times the amount of movement of said parts. There is no sleeve 177 or pinion 178 on the lowest order actuator shaft.

Mounted on the sleeve 90 of each intermediate shaft 91 except that of the order next higher than the highest order row of keys, is a five-tooth gear 179; and mounted on the sleeve 90 of each intermediate shaft 91 except that of lowest order is a four-tooth stepped gear 180 similar in all respects to the gears 89 of the normal or simple registering mechanism.

When the normal registering mechanism is active,—i. e. when neither the 2X key 41 nor the 5X key 42 is depressed,—the sleeves 90 are in their centralized position, and the gears 179 and 180 stand far enough in rear of pinions 166 and 178, respectively, so that the pinions 166 and 178 cannot be moved sufficiently by the keys 39 and bars 61 and 63 to come into the active zones of the gears 179 and 180. When the 2X key 41 is depressed and the sleeves 90 are forced rearwardly, the gears 179 and 180 are moved even farther from the pinions 166 and 178. But when the 5X key 42 is depressed, the sleeves 90 are moved forwardly on shafts 91 until the several gears 179 and 180 stand very slightly in rear of pinions 166 and 178 respectively.

It will be thus seen that when any key of odd digital value is depressed the sleeve 165 of the same order will be shifted to bring its pinion 166 into the same plane as its respective five-tooth gear 179, so that the latter will rotate the former upon the subsequent operation of the main operating handle 44 thru a cycle of operation. It will also be seen that depression of the "2" or "3" key will move pinion 178 of the next higher order into the plane of the forward or one-tooth step of gear 180; depression of the "4" or "5" key will move pinion 178 into the plane of the second or two-tooth step of gear 180; depression of the "6" or "7" key will move pinion 178 into the plane of the third or three-tooth step of gear 180; and depression of the "8" or "9" key will move pinion 178 into the plane of the rearmost or four-tooth step of gear 180.

From this it follows that depression of any digit key when the 5X key 42 is depressed will effect registration of the product of the digit key value multiplied by five upon a single cycle of operation of the operating handle.

*The 5X four stop (Figs. 2, 3, 7, 8 and 10)*

Means are provided for preventing over-rotation of an actuator shaft when the pinion 178 and gear 180 associated therewith are active and the pinion 166 and gear 179 associated therewith are inactive.

Pinned to the shaft 76 of the next higher order than that of the highest row of digit setting keys 39, and secured to each of the sleeves 165 except that of lowest order is a scalloped wheel or disk 181 precisely like the scalloped wheels 109 of the "normal four stop" mechanism. These scallop-wheels 181 are so positioned with respect to the stop lugs 110 on the sleeves 90 of the intermediate shafts 91 that when the 5X key 42 is depressed the lugs 110 are moved by the sleeves 90 from the plane of the scallop-wheels 109 of the "normal four stop" to the plane of the scallop-wheels 181. In this new position, the lugs 110 coact with the scallop-wheels 181 to prevent over-rotation of the shafts 76 when only their respective pinions 180 are active or rather when their pinions 166 are inactive. But when a pinion 166 is moved to active position, then the scallop-wheel 181 associated with that pinion is moved out of the plane of its coactive lug 110, and that actuator shaft may be rotated by its pinion 166 and the coacting gear 179 as well as the pinion 180 and coacting gear 178.

The reason why the scallop gear is pinned to the actuator shaft 76 of next higher order to the highest order of digit setting keys, is that except for carrying, this shaft is always operated by a cooperative gear 180 when it is operated at all during the time that the 5X key is depressed. Also there is no scallop-wheel on the actuator shaft of lowest order because while the 5X key is depressed, this shaft is never operated by a gear 180 and pinion 178 but always by a gear 179 and pinion 166, if it is actuated at all.

*The counter driving mechanism (Figs. 2, 5, 8, 9, 10, 21, 22, 23 and 24)*

Mounted on the sleeve 90 of the lowest order are a single-tooth sector 182, a two-tooth sector 183, and a five-tooth sector 184. When the sleeve is in its "normal" or centralized position, the single-tooth sector 182 is in the plane of a gear 185; but when the sleeve is moved rearwardly by operation of the 2X key 41 the two-tooth sector 183 is brought into the plane of said gear 185; and when sleeve 90 is moved forwardly by operation of the 5X key 42, the five-tooth sector 184 is brought into the plane of said gear 185. Consequently, when the machine is given a normal cycle of operation, the gear 185 will be turned one tooth by the sector 182, and when the 2X key 41 or the 5X key is depressed and the machine operated, the gear 185 will be given a two-tooth movement or a five-tooth movement.

The gear 185 is pinned on a short shaft 186 having its bearings in the frame members 33 and 34 and in a bracket 187 extending from the right hand frame member 30. A leaf spring or detent 197 rides on the gear 185 so as to prevent over-rotation of the same. The rear end of the shaft 186 is square in cross section and has slidably mounted upon it a sleeve 188 formed with a groove 189 into which extend the bifurcations of the lower end of a finger 190 depending from the bar 191, which is utilized in shifting the gears 119 and 120 for effecting adding or subtracting at will, as is well known in the art.

Secured to the front end of sleeve 188 is a gear 192 which may mesh with either of two gears 193 and 194. When the machine is set for adding the gear 192 meshes with gear 193 and when the machine is set for subtraction the gear 192 meshes with the gear 194.

The gear 193 meshes directly with a gear 195 to which is pinned the counter actuator gear 125 which meshes with the counter gear 124 so as to operate the counter dial. The subtractive counter gear 194 meshes with an idler gear 196 which meshes with the aforesaid gear 195. The supporting stub shafts for the gears 194 and 196 are mounted in the intermediate frames 34 and 35. The additive counter gear 193 is mounted freely on the intermediate shaft 91 of lowest order, and the gear 195 is mounted freely on a stud extending from the intermediate frame 35.

The above arrangement of gears is such that when the gear 192 is in mesh with the gear 193 each operation of the machine will cause the counter dial 123 cooperative with the gear 125 to register 1, 2, or 5 according to the type of operation being performed and to register this amount positively or additively. When the gear 192 has been moved into cooperative relation with the subtractive gear 194, each operation of the machine will cause a similar registration on the associated counter dial but in a negative or subtractive direction.

If desired the counters may be provided with carrying or tens-transfer mechanism, but such mechanisms are old and well known in the art and are therefore not shown or described in detail here.

*Examples of operation*

Now having described the mechanism and mechanical operation of the machine, several examples of the work done by the machine will be given.

*I. Simple addition and subtraction.*—The operation of the machine for performing these operations is thought to be too obvious from the analogous teachings of the prior art to need a detailed example.

*II. Multiplying by two.*—Take the problem 2 times 172. First, depress the 2X key and throw the shift lever 43 to "adding" position. Then set up "172" in the digit setting keys and give the operating crank 4 one cycle of operation. The result "344" will appear on the appropriate accumulator dials. The operation of parts has been as follows:

When the 2X key was depressed, all of the sleeves 90 were moved rearwardly thereby disabling the gears 88 and 89 of the normal registering means and enabling the gears 148 and 150 of the 2X mechanism. Then depression of the "2" key in the units row moved the pinion 149 of the units actuator shaft 76 into the plane of the second or four-tooth step of the cooperative gear 148; the depression of the "7" key in the tens row moved the pinion 149 of the tens actuator shaft 76 into the plane of the second or four-tooth step of the cooperative gear 148 and simultaneously moved the pinion 152 of the hundreds row into the plane of its co-operative single-tooth gear 150; and depression of the "1" key in the hundreds row moved the pinion 149 of the hundreds actuator shaft 76 into the plane of the first or two-tooth step of the cooperative gear 148.

Upon the operation of the main operating crank 44 the units intermediate shaft 91 rotated the gear 148 thereof causing it to move the units actuator shaft by four teeth or digit spaces so that the units dial registered and indicated "4". In like manner the tens actuator shaft was rotated four teeth or digit spaces so as to turn its correlated dial to indicate "4". The hundreds intermediate shaft 91 in rotating caused two spaces or teeth of movement of the hundreds actuator shaft by the cooperation of the gear 148 and pinion 149 on these shafts and this movement was immediately followed by a one-tooth or space movement caused by the operation of the single-tooth gear 150 on the pinion 152. The hundreds dial, therefore, has been turned three teeth to indicate "3".

At the same operation, the sector 183 was brought into coacting relation to gear 185 and turned that gear two teeth thereby registering the multiplier "2" in the associated counting dial.

*III. Multiplying by five.*—Take the problem 5 times 127. First depress the 5X key and throw the shift lever 43 to "adding" position. Then set up "127" in the digit-setting keys and give the operating crank 44 one cycle of operation. The result "635" will appear on the appropriate accumulator dials. The operation of parts has been as follows:

When the 5X key was depressed, all of the sleeves 90 were moved forwardly thereby disabling the gears 88 and 89 of the normal registering means and enabling the gears 179 and 180 of the 5X mechanism. Then depression of the "7" key in the units row moved the pinion 166 of the units actuator shaft into the plane of the five-tooth gear 179 cooperative therewith, and simultaneously moved the pinion 178 of the tens actuator shaft into the plane of the third or three-tooth step of the gear 180 associated therewith; depression of the "2" key in the tens row resulted merely in moving the pinion 178 of the hundreds actuator shaft into the plane of the first or single-tooth step of the cooperative gear 180; and depression of the "1" key of the hundreds row moved the pinion 166 of the hundreds row into the plane of its associated gear 179.

Upon operation of the operating handle 44 the several intermediate shafts 91 were given a cycle of rotation whereby the gear 179 of lowest order turned the units actuator shaft 76 through five teeth or digit steps and the units dial was thereby turned to indicate "5".

The tens actuator shaft was turned through three spaces by the cooperation of its pinion 178 with the three-tooth step of the cooperative gear 180 and its associated dial was turned to indicate "3"; and the hundreds actuator shaft was turned first through one space or step of movement by reason of the cooperation of its pinion 178 with the first or single-tooth step of the cooperative gear 180 and was thereafter turned through five further teeth or digit spaces by cooperation of its pinion 166 with the respective gear 179, so that the hundreds actuator shaft was turned six digit spaces in all, and the associated accumulator gear was brought to indicate "6".

At the same operation, the sector 184 was brought into coacting relation to gear 185 and turned that gear five teeth thereby registering the multiplier "5" in the associated counting dial.

*IV. Multiplying by other digits.*—Multiplying by any one of the digits 3, 4, 6, 7, 8 or 9 may be accomplished by the combination of the forms of multiplying already described. Thus, if the number is to be multiplied by "3" it will be set up on the keyboard and one cycle of operation will be given with the 2X key in control and one cycle with the mechanism in centralized or normal condition. If the number is to be multiplied by "4", two cycles of operation with the 2X key in control will be given. If the number is to be multiplied by "6" one cycle of operation with the 5X key in control and one cycle in normal condition will be given. If the number is to be multiplied by "7" one cycle of operation will be given with the 5X key in control and one cycle of operation with the 2X key in control. If the number is to be multiplied by "8" one cycle of operation may be given with the machine in each of its three conditions. If the number is to be multiplied by "9" the machine may be given one cycle of operation under control of the 5X key and two cycles of operation under control of the 2X key. In this last instance it may be easier to give two cycles of operation under control of the 5X key and then one subtractive cycle of operation with the machine in normal.

It will be noted that the machine is well adapted for multiplying by 10 without shifting the carriage as two cycles of operation of the machine with the carriage in one position can be more easily accomplished than by shifting the carriage and then giving the machine a cycle of operation. Other forms of short-cut work will be apparent to those skilled in the use of calculating machines.

*V. Division.*—In order to perform division on the machine the dividend is set up on the keyboard and entered on the registers. The shifting lever is then set for subtractive operation of the registers, the divisor is set on the digit keys, and the machine is operated as for multiplication. In a machine provided with reversely operable counters it would be necessary for the counter dials to be of the well-known "nineteen-point" type in order to have the counter dials show the correct quotients. If the mechanism is made to drive the counters in the same direction regardless of the position of the shift lever 43 then the counters could be of the usual "ten-point" type.

While I have described what I consider to be a highly desirable embodiment of my invention, it is obvious that many changes could be made without departing from the spirit of my invention, and I, therefore, do not limit myself to the exact construction herein shown nor to anything less than the whole of my invention as hereinbefore described and as hereinafter claimed.

I claim:

1. In a calculating machine, the combination with a register of an actuating shaft therefor, a plurality of settable pinions thereon, digit-setting means for concomitantly setting all of said pinions, respective operating members for each of said pinions and means whereby certain of said operating members may be rendered effective and the others ineffective at the will of the operator.

2. In a calculating machine, the combination with a register of an actuating shaft therefor, a plurality of settable pinions thereon, digit-setting means for concomitantly setting all of said pinions, a plurality of gears including a respective operating gear for each of said pinions, and means whereby certain of said gears may be rendered effective and the others ineffective at the will of the operator.

3. In a calculating machine, the combination with a register of an actuating shaft therefor, a plurality of settable pinions thereon, digit-setting means for concomitantly setting all of said pinions, a plurality of gears including a respective operating gear for each of said pinions and means for moving all of said gears bodily to render certain of said gears effective and the others ineffective at the will of the operator.

4. In a calculating machine, the combination with a register of an actuating shaft therefor, a plurality of settable pinions thereon, digit-setting means for concomitantly setting all of said pinions, a plurality of gears including a respective operating gear for each of said pinions, and means for moving all of said gears bodily in one direction for rendering certain of said gears effective and in another direction for rendering certain other of said gears effective.

5. In a calculating machine, the combination with a register, of an actuator therefor, a differential operating gear for operating said actuator variable amounts, means for stopping said actuator at the end of the effective movement of said gear, a second operating gear for operating said actuator the same amount at each effective operation of said second gear, and manipulative means for concomitantly rendering said second gear effective and the first said means ineffective.

6. In a calculating machine, the combination with registers; of actuator shafts therefor; means settable thereon to concomitantly set up a preliminary representation of an item, two times the item, and five times the item; operating devices; means for moving said operating devices in one direction to render them operative to effect operation of said shafts in accordance with the preliminary representation of two times the item, means for moving said operating devices in the opposite direction to render them operative to effect operation of said shafts in accordance with the preliminary representation of five times the item, and means for normally centralizing said operating devices to render them operative to effect operation of said shafts in accordance with the preliminary representation of the item.

7. In a calculating machine, the combination with registers, of a pair of actuator shafts therefor and of successive denominational orders, a pair of item registering pinions on the shaft of lower order, a multiple registering pinion on each of said shafts, a differential operating gear for one of the pinions of said pair, a differential operating gear for one of said multiple registering pinions, operating gears for the other of said pinions, a single denominational row of digit keys for simultaneously controlling setting of all of said pinions, and means for controlling said gears to cooperate with said item registering pinions or said multiple registering pinions at the will of the operator.

8. In a calculating machine, the combination of registers, actuators therefor, digit setting means, a pair of pinions operatively associated with one of said actuators and simultaneously movable by said digit setting means according to the digit set up, a pair of differential gears each operatively associated with a respective one of said pinions, and means for simultaneously moving both of said gears to render one or the other effective.

9. In a calculating machine, the combination of registers, actuators therefor, digit setting means, a pair of pinions operatively associated with one of said actuators and simultaneously movable by said digit setting means according to the digit set up, a pair of differential gears each operatively associated with a respective one of said pinions, and one of said gears having twice as many teeth as the other, and means for simultaneously moving both of said gears to render one or the other effective.

10. In a calculating machine, the combination of registers, actuators therefor, operating mechanism for said actuators including a plurality of sleeves and a plurality of gears on each of said sleeves, and means for simultaneously moving all of said sleeves bodily to render certain of the gears on each effective.

11. In a calculating machine, the combination of registers, actuators therefor, operating mechanism for said actuators including a plurality of sleeves and a plurality of gears on each of said sleeves and means for simultaneously moving all of said sleeves bodily in one direction to render certain of the gears on each effective, and for simultaneously moving all of said sleeves bodily in the opposite direction for rendering certain other of said gears on each effective.

12. In a calculating machine, the combination of a register wheel, an actuator shaft therefor, two pinions on said shaft and each operable for actuating said register wheel, two mutilated gears for actuating respective ones of said pinions, and an intermediate shaft carrying said gears, the teeth of each mutilated gear lying out of the angular plane of the teeth of the other mutilated gear, and means for adjusting one or both of said pinions relatively to said gears whereby various digital actuations may be selected.

13. In a calculating machine, the combination of a register wheel, an actuator shaft therefor, two pinions on said shaft and each operable for actuating said register wheel, two mutilated gears for actuating respective ones of said pinions, an intermediate shaft carrying said gears, the teeth of each mutilated gear lying out of the angular plane of the teeth of the other mutilated gear, means for adjusting one or both of said pinions relatively to said gears whereby various digital actuations may be selected, a stop normally operable to prevent rotation of the actuator shaft after a registering operation of one mutilated gear and means for disabling said stop when the pinion is adjusted for operation by the other mutilated gear.

14. In a calculating machine having register wheels and an operating shaft; differential actuators between said shaft and said wheels, the actuators related to each wheel being settable to represent certain digits of one or of two partial products of a total maximum value of nine, and said actuators being so related to the driving shaft that the partial products will be registered simultaneously in all denominational orders and in a single cycle of operation.

15. In a calculating machine having register wheels, multiplicand keys, multiplier setting elements, and differential actuators for said wheels settable by said keys and by said elements to represent products; a member operable in unison with the registering movement of said actuators, and means actuated by said member at the end of a cycle of operation to shift said multiplier setting elements and thereby change the setting of said differential actuators.

16. In a calculating machine having register wheels, settable multiplicand keys, multiplier setting elements, and differential actuators for said wheels, settable by said keys and by said elements to represent products; a member operable in unison with the registering movement of said actuators, and means actuated by said member at the end of a cycle of operation to retract said multiplier setting elements and change the actuators to a setting representing the value of the set multiplicand keys.

Signed at Orange, in the county of Essex and State of New Jersey.

GEORGE C. CHASE.